Dec. 1, 1959  J. R. GUHL  2,915,002
PORTABLE POWER DRIVEN SPIT
Filed April 30, 1957   2 Sheets-Sheet 1
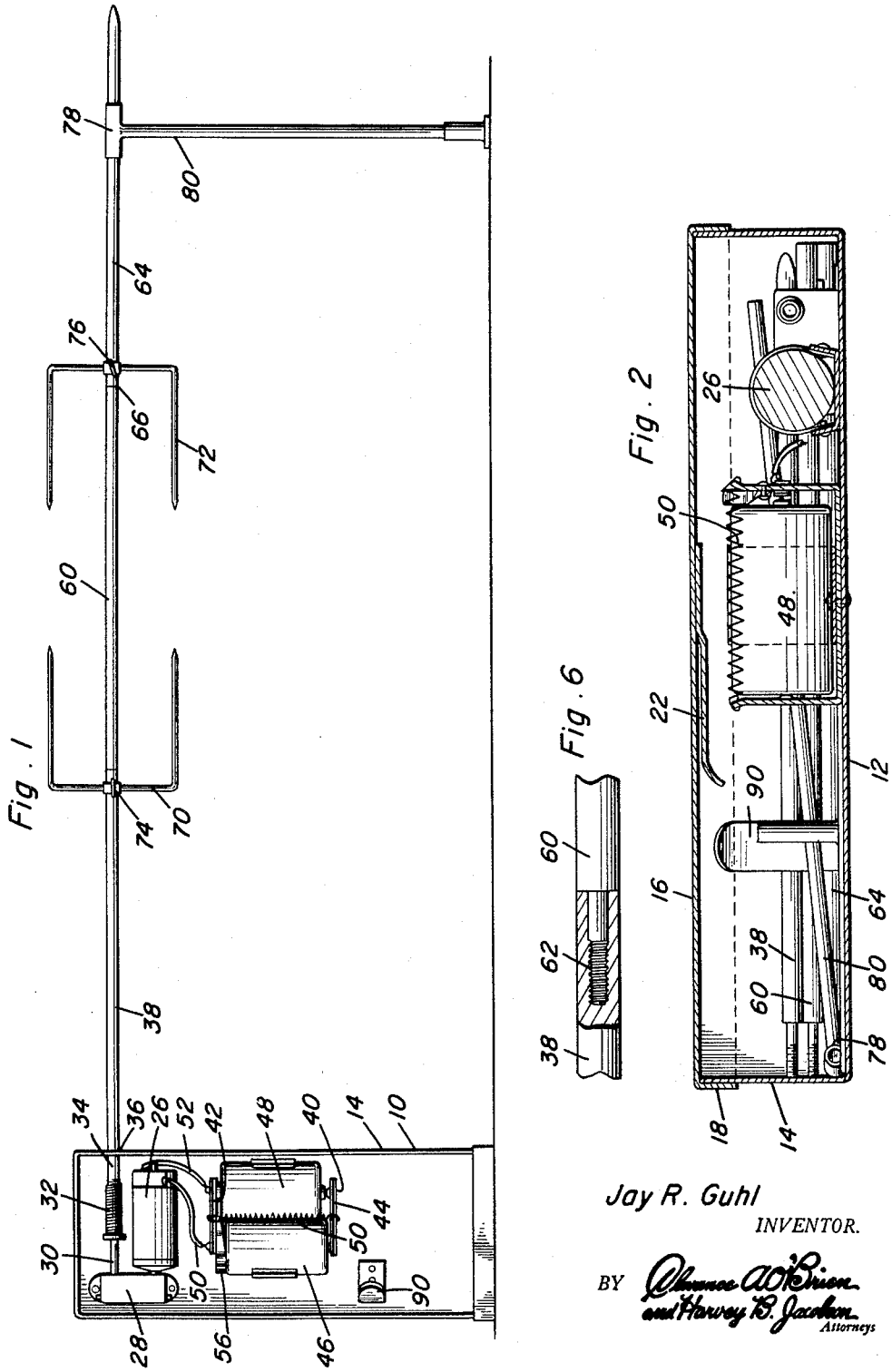
Jay R. Guhl
INVENTOR.
BY Thomas A. O'Brien
and Harvey B. Jackson
Attorneys Dec. 1, 1959 J. R. GUHL 2,915,002
PORTABLE POWER DRIVEN SPIT
Filed April 30, 1957 2 Sheets—Sheet 2
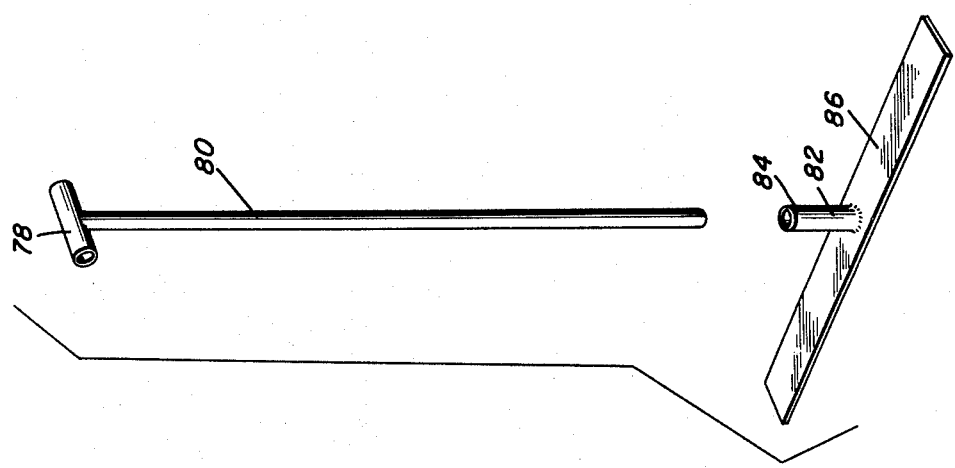
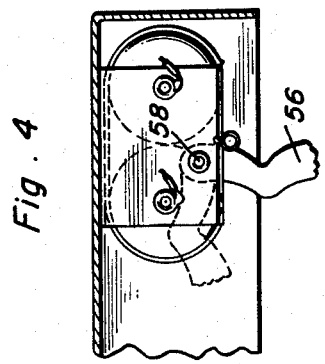
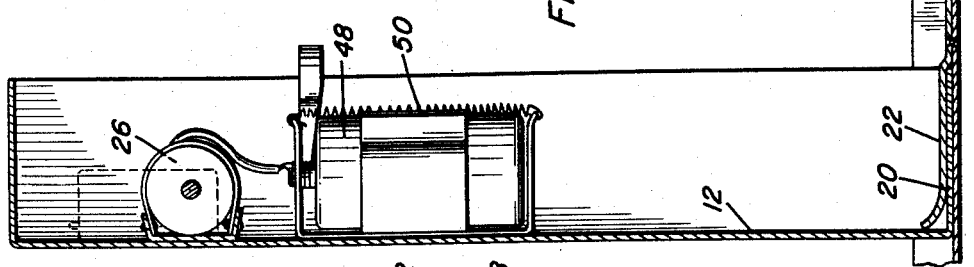
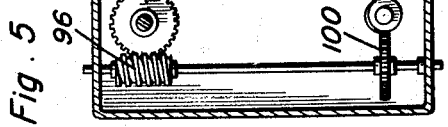
Jay R. Guhl
INVENTOR.
BY
Attorneys

United States Patent Office 2,915,002
Patented Dec. 1, 1959

2,915,002

PORTABLE POWER DRIVEN SPIT

Jay R. Guhl, Redwood City, Calif.

Application April 30, 1957, Serial No. 656,010

4 Claims. (Cl. 99—421)

This invention relates to a portable power driven spit which may be used on a kitchen stove, in a fireplace, barbecue pit, campfire, over a charcoal burner or a canned heat burner and is otherwise very versatile.

The primary object of the present invention resides in the provision of a portable power driven spit for use by the outdoor sportsman, the hunter and fisherman, and for use by other persons on camping trips, outdoor parties, picnics, wiener roasts, and the like in a manner so as to eliminate the necessity for packing burdensome pans and utensils by providing in itself a compact unit for cooking.

A further object of the present invention resides in the provision of a portable power driven spit which is capable of being readily and speedily disassembled after use and capable of storage in the housing thereof with the covering of the housing being adapted to form a secure base so as to enable the device to be set up in a boat, on sand, solid rock, or on rough and irregular footing wherever a small fire can be used.

These, together with the various ancillary objects and features of the invention which will become apparent as the following description proceeds, are attained by this portable power driven spit, a preferred embodiment of which has been illustrated in the accompanying drawings, by way of example only, wherein:

Figure 1 is an elevational view of the assembled spit;

Figure 2 is a vertical sectional view of the portable power driven spit shown in disassembled position with the cover in position over the housing;

Figure 3 is an enlarged vertical sectional detail view illustrating the manner in which the housing is secured on the cover when the cover is used as the base for the portable power driven spit;

Figure 4 is a sectional detail view illustrating the construction and manner of operation of the switch employed in the present invention;

Figure 5 is a sectional detail view illustrating the construction of the drive means employed in the invention;

Figure 6 is a partial sectional detail view illustrating the connection between the various sections of the spit rod; and Figure 7 is a partial exploded perspective view of portions of the invention including the spit rod support and base therefor.

With continuous reference to the accompanying drawings wherein like reference numerals designate similar parts throughout the various views, reference numeral 10 is used to generally designate the housing of the portable power driven spit comprising the present invention. This housing includes a base wall 12 and surrounding peripheral walls 14. A cover 16 having a flange 18 is provided the flange engaging the peripheral walls 14 when the invention is in a disassembled position as is shown in Figure 2.

When the invention is erected for use as shown in Figures 1 and 3, the peripheral wall 14 is arranged so that the lower wall portion 20 thereof is engaged between a clip 22 and the cover 24 holding the housing 10 in a secure manner with the base wall 12 extending vertically.

Secured to the base wall 12 is a motor 26 which drives through a speed reducer 28 and shaft 30. The shaft 30 includes a flexible resilient shaft portion 32 and carries an end portion 34. The housing 14 is provided with an aperture therethrough in alignment with the shaft portion 34 as at 36 to which a spit section 38 is threadedly detachably secured. While the motor 26 may be a spring driven motor, it is within the concept of the present invention to employ a battery housing 40 of generally U-shape having upper and lower legs 42 and 44. These upper and lower legs are adapted to contact the terminal ends of the dry cell batteries 46 and 48. A spring 50 is terminally secured to the legs 40 and 42 and draws the legs together. The leg 42 carries suitable insulative contacts and conductors 50 and 52 are connected to these contacts and to the motor 26.

Pivotally attached to the leg 42 is a cam switch 56 of any suitable insulative material which is designed to lift the leg 42 and hence the contacts carried thereby out of engagement with the batteries 46 and 48 by cam action in engagement with the battery 46 and the leg 42. The switch is pivoted as at 58.

The spit section 38 is designed to have the spit section 60 threadedly detachably secured thereto by means of a threaded connection as at 62, see Figure 6. Further, a spit section 64 is threadedly detachably secured to the spit section 30, the joint being shown as at 66 much in the same manner as the connection between the sections 38 and 60. Suitable adjustable forks of U-shape as indicated at 70 and 72 for holding foodstuffs in place on the spit rod are held in place by means of clamp fasteners 74 and 76. The end of the spit rod is designed to be received in the tubular cross arm 78 of a spit support 80 which is detachably received in a T-shaped base 82 having a tubular upright portion 84 and a base plate 86.

When the invention is disassembled, the spit support as well as the spit rod sections are all held in place by means of a suitable clip such as indicated at 90, in Figure 1 and by the position of the other elements of the invention. Then, the cover can be placed on the housing and the entire device easily transported from one location to another.

In use, the switch 56 need be activated to cause the motor 26 to drive the shaft 30 which at times rotates the spit rod formed of the sections 38, 60 and 64 in a suitable manner, quite slowly, for roasting and cooking as may be desired. The drive connection 28 as can be seen best in Figure 5 includes a double worm gear arrangement as indicated at 96 and 98 and 100 and 102 whereby the speed of the shaft 30 can be greatly reduced.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A portable spit comprising a housing, a cover for said housing having a clip secured thereto, said housing having a base wall received in said cover with said clip engaging said base wall, a motor in said housing, a shaft in said housing driven by said motor, said housing having an aperture therethrough in alignment with said shaft, a spit rod threadedly secured to said shaft, a spit rod stand, the end of said spit rod remote from said shaft being rotatably supported by said spit rod stand, a battery support in said housing, batteries carried by said battery support, said batteries powering said motor, and a cam switch pivotally secured to said battery support for urging said battery support away from said batteries to break connection between said batteries and said motor.

2. A portable spit comprising a housing, a cover for said housing having a clip secured thereto, said housing having a base wall received in said cover with said clip engaging said base wall, a motor in said housing, a shaft in said housing driven by said motor, said housing having an aperture therethrough in alignment with said shaft, a spit rod threadedly secured to said shaft, a spit rod stand, the end of said spit rod remote from said shaft being rotatably supported by said spit rod stand, a battery support in said housing, batteries carried by said battery support, said batteries powering said motor, a cam switch pivotally secured to said battery support for urging said battery support away from said batteries to break connection between said batteries and said motor, said battery support being U-shaped having opposed legs for engaging said batteries, and a spring extending between said opposed legs urging said legs together into engagement with said batteries.

3. A portable spit comprising a housing, a cover for said housing having a clip secured thereto, said housing having a base wall received in said cover with said clip engaging said base wall, a motor in said housing, a shaft in said housing driven by said motor, said housing having an aperture therethrough in alignment with said shaft, a spit rod threadedly secured to said shaft, a spit rod stand, the end of said spit rod remote from said shaft being rotatably supported by said spit rod stand, said spit rod being formed in sections threadedly detachably secured together, adjustable forks adjustably secured on said spit rod, a battery support in said housing, batteries carried by said battery support, said batteries powering said motor, and a cam switch pivotally secured to said battery support for urging said battery support away from said batteries to break connection between said batteries and said motor.

4. A portable spit comprising a housing, a cover for said housing having a clip secured thereto, said housing having a base wall received in said cover with said clip engaging said base wall, a motor in said housing, a shaft in said housing driven by said motor, said housing having an aperture therethrough in alignment with said shaft, a spit rod threadedly secured to said shaft, a spit rod stand, the end of said spit rod remote from said shaft being rotatably supported by said spit rod stand, said spit rod being formed in sections threadedly detachably secured together, adjustable forks adjustably secured on said spit rod, a battery support in said housing, batteries carried by said battery support, said batteries powering said motor, a cam switch pivotally secured to said battery support for urging said battery support away from said batteries to break connection between said batteries and said motor, said battery support being U-shaped having opposed legs for engaging said batteries, and a spring extending between said opposed legs urging said legs together into engagement with said batteries.

References Cited in the file of this patent

UNITED STATES PATENTS

| 1,122,466 | Beyer | Dec. 29, 1914 |
| 2,477,183 | Humensky | July 26, 1949 |
| 2,783,705 | Vrionis | Mar. 5, 1957 |
| 2,827,848 | Alden | Mar. 25, 1958 |

FOREIGN PATENTS

| 316,124 | Switzerland | Nov. 15, 1956 |